Patented Nov. 15, 1938

2,136,427

UNITED STATES PATENT OFFICE 2,136,427

INDIGOID DYE REDUCTION PRODUCTS AND PROCESSES FOR MAKING THE SAME

Arthur L. Fox, Wilmington, Del., assignor to E. I. du Pont de Nemours & Company, Wilmington, Del., a corporation of Delaware No Drawing. Application September 28, 1932, Serial No. 635,198

1 Claim. (Cl. 260—331)

This invention relates to new indigoid dye reduction products and processes for making the same.

It is well known that indigoid dyes may be reduced to their so-called leuco compounds which are soluble in aqueous caustic alkalies and that these leuco compounds are readily converted to the original dye upon oxidations, even such as is accomplished by the action of air. This fact has been taken advantage of in the dyeing industry, wherein the indigoid dye is customarily treated with an aqueous solution containing a reducing agent and strong caustic alkali in the proportion of two or more moles of the caustic to each mole of the dye, thus producing a vat containing the soluble leuco compound. The materials to be dyed are dipped in the vat so produced and then exposed to the air, whereupon the oxygen in the air oxidizes the leuco compound to the original dye. In such a process, it has always been regarded as necessary to employ a strong caustic alkali, such as sodium and potassium hydroxide, in order to produce the soluble leuco compound.

An object of the present invention is to produce modified leuco compounds from indigoid dyes which are generally insoluble in aqueous alkalies and are generally stable to air. A further object is to produce such products which are valuable in printing processes. A still further object is to provide a process for producing such new products. Still other and further objects are to provide new compositions of matter and to advance the art. Other objects will appear hereinafter.

These objects may be accomplished in accordance with my invention which comprises treating an indigoid dye with an aqueous solution of a reducing agent such as has been previously utilized but in the absence of added alkali. In other words, the reduction of the indigoid dye is carried out in substantially the same manner as has previously been the practice except that no alkali is added or employed other than that naturally present in the reducing agent. The alkali, if any, naturally present in the reducing agent will be insufficient, as a general rule, to give the solution an alkaline reaction and, in fact, when sodium hydrosulfite is employed the solution appears to have a slightly acid reaction.

The substances produced in accordance with this invention are generally stable toward oxidation by air. However, the stability of the various products varies somewhat. Also, in some cases, it is advantageous to acidify the products once produced to render them still more stable against oxidation employing a non-oxidizing acid such as, hydrochloric, sulfuric, acetic and carbonic acids for this purpose.

The reducing agents to be employed preferably comprise sodium hydrosulfite although other equivalent reducing agents, ordinarily employed for reducing indigo dyes, such as sodium formaldehyde sulfoxylate, may be used in sufficient amount to reduce all of the dye. The temperatures at which the reduction is caused to take place may vary within a rather wide range but should generally be maintained above 50° C. and it will usually be found expedient to employ temperatures not above those necessary for boiling. Under atmospheric conditions, however, I have found temperatures of from 70–100° C. to be the preferable temperatures, being the most practical and efficient. However, higher or lower temperatures may be employed, if desired.

When the reduction of an indigoid dye is accomplished in accordance with the above described conditions, a product is formed which has a color greatly different from that of the original dye and which is generally insoluble in water and stable towards oxidation by the oxygen of the air. These products are valuable in printing processes when made up into pastes.

Since the specific reactions, which take place during the reduction accomplished in accordance with my invention, are not definitely known, and the structure of the resulting products is also not definitely known, no attempt is made at the present time to give any theoretical description of the reactions taking place or of the structural formulas of the materials produced.

In order to more clearly illustrate my invention and the preferred mode in which I contemplate carrying the same into effect, the following examples are given:

*Example 1.*—A mixture was formed from

| | Parts |
|---|---|
| 4:4′-di-methyl-6:6′-dichloro thioindigo | 6.25 |
| Water | 250.00 |
| Sodium hydrosulfite | 15.00 |

This mixture was heated at the boil for one half hour whereupon an insoluble cream-pink colored precipitate formed. This was filtered off, washed with a little dilute acid, and made up into a paste. The solid was stable toward oxidation by air. It tended to turn a brownish-purple color on standing.

*Example 2.*—The following ingredients were mixed:

| | Parts |
|---|---|
| 6:6′-dichloro thioindigo | 6 |
| Water | 250 |
| Sodium hydrosulfite | 15 |

The mixture was heated at 90° for two hours. A dirty purple colored insoluble precipitate was formed which was filtered off, washed, and made up into a paste. The solid product was stable toward the oxygen of the air.

*Example 3.*—A mixture of the following was prepared:

| | Parts |
|---|---|
| 2:1–2′:1′-naphth thioindigo | 10 |
| Water | 250 |
| Sodium hydrosulfite | 15 |

This mixture was heated to the boil and in a very few minutes a cream colored insoluble precipitate was formed which was filtered off and washed with dilute acid. This appeared to be somewhat less stable toward air oxidation than the product obtained from any of the other dyes. On treating with dilute NaOH, this leuco changed color from cream to deep brownish red and went into solution. It was then even more readily oxidized than the leuco prepared by reduction in the presence of strong caustic.

Other indigoid dyes may be treated in accordance with my invention with the production of valuable products. Some of these other indigoid dyes which deserve special mention are:

6:6′-diethoxy-thioindigo
7:7′-dimethoxy-5:5′-dichlor-thioindigo
2(5,7 - dibromindole) 2′,4,7 - dimethyl - thionaphthene indigo From the above examples, it will be apparent that my process is of general application for the production of new substances for use in printing processes from indigoid dyes. The term "indigoid dyes" as employed throughout the specification and claim is the customary use of this term as employed by Truttwin, "Enzyklopädie der Küpenfarbstoffe", and includes all such dyes which contain the grouping:

wherein R is an aryl nucleus and X represents NH, S or Se.

The modified leuco compounds of my invention may be employed in printing pastes. A representative printing paste is prepared by mixing the following ingredients:

| | Parts |
|---|---|
| An 8% suspension of the modified leuco prepared from an indigoid dye | 20 |
| Potash | 9.1 |
| Sodium formaldehyde sulfoxylate | 6.6 |
| Glycerine | 10.0 |
| Thickener | 54.3 |

The thickener employed is prepared by mixing

| | Parts |
|---|---|
| Wheat starch | 1 |
| British gum | 3 |
| Water | 4 |
| Gum tragacanth (6% solution) | 1 |

This mixture is boiled for 10–15 minutes and then cooled whereupon it is ready for incorporation in the paste.

The paste, prepared as above, is printed on the desired material allowed to dry and aged for about 5 minutes at about 214–216° F. The material is then subjected to oxidation, rinsed, soaped, rinsed again and then dried.

Certain stable leucos made by another process than that disclosed herein are disclosed in my copending application Serial Number 634,202, filed September 21, 1932.

While I have disclosed certain new compounds produced according to processes employing specific proportions of specific reagents, under particular conditions, it will be readily understood that many variations and changes may be made in the process, the reagents, and conditions employed, without departing from the spirit of my invention. Accordingly, the scope of my invention is to be limited solely by the appended claim construed as broadly as is permissible in view of the prior art.

I claim:

The process of preparing a reduction product of a thioindigo dye which comprises reducing the dye in a reaction medium consisting of an alkali metal hydrosulphite and water, and heating in the reaction medium until a stable leuco of the dye is formed.

ARTHUR L. FOX.